G. EVANOVITCH.
WHEEL GUARD OR OBSTRUCTION REMOVER FOR MOTOR ROAD VEHICLES.
APPLICATION FILED MAY 5, 1913.
1,113,421.
Patented Oct. 13, 1914.
3 SHEETS—SHEET 1.
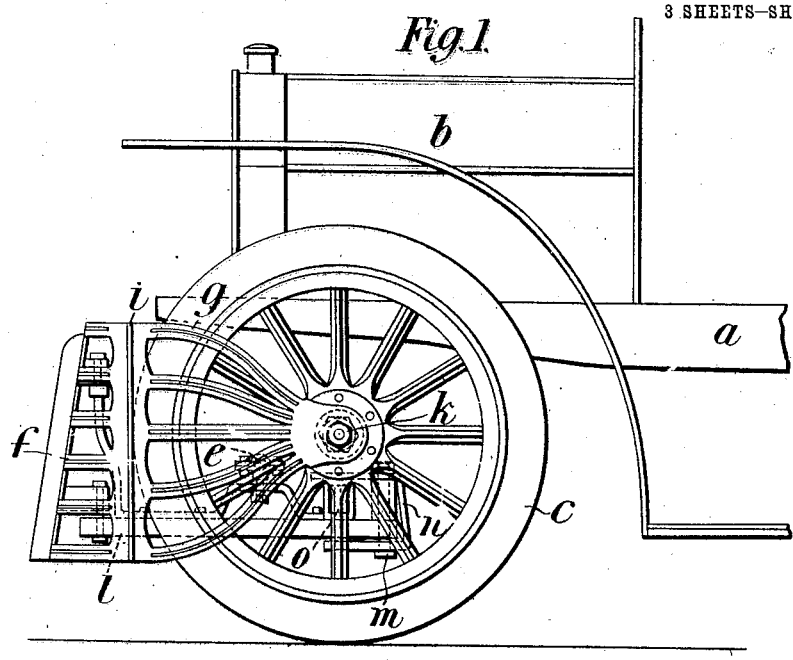
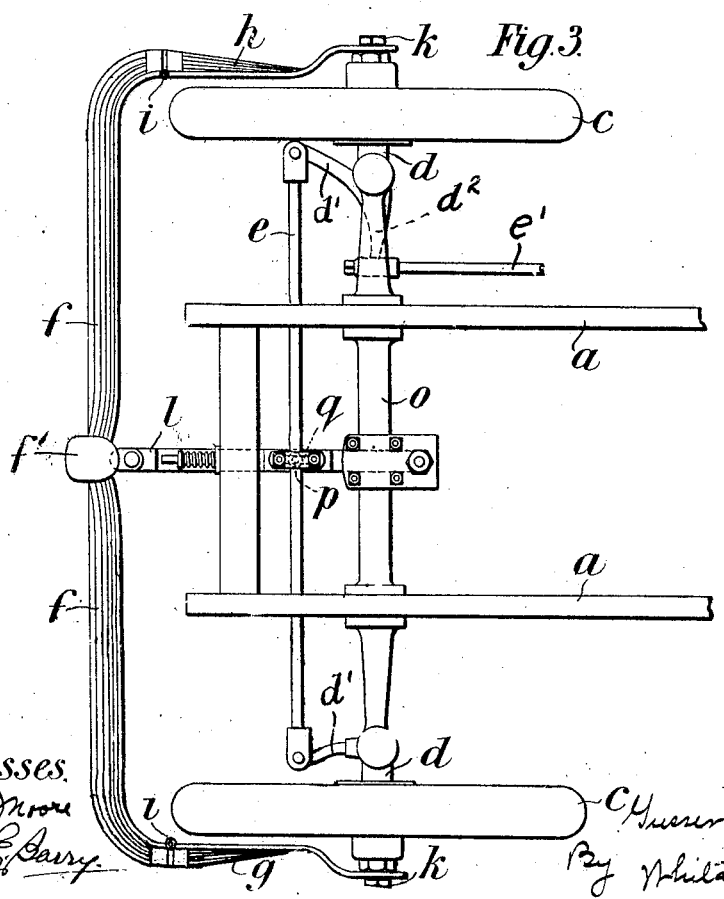

G. EVANOVITCH.
WHEEL GUARD OR OBSTRUCTION REMOVER FOR MOTOR ROAD VEHICLES.
APPLICATION FILED MAY 5, 1913.
1,113,421.
Patented Oct. 13, 1914.
3 SHEETS—SHEET 2.
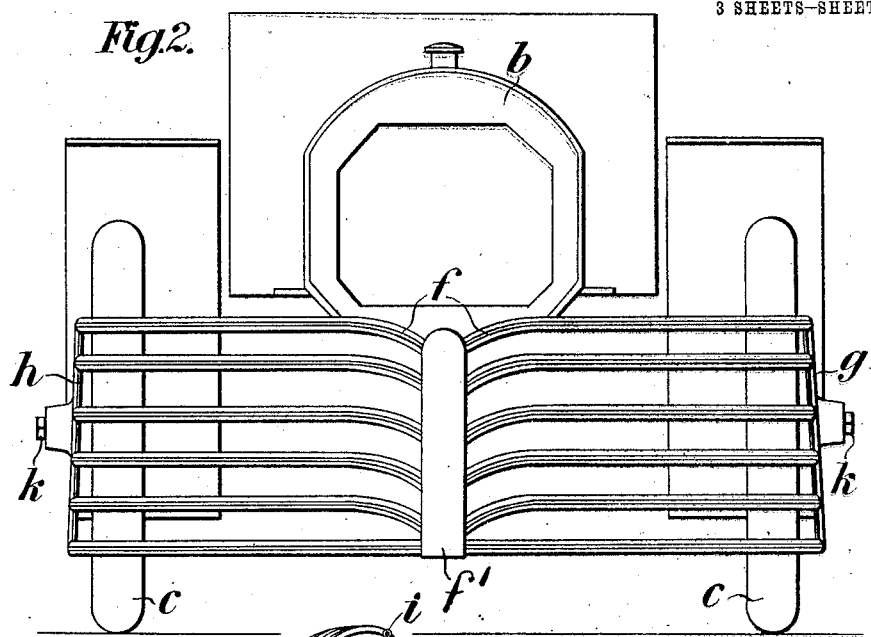
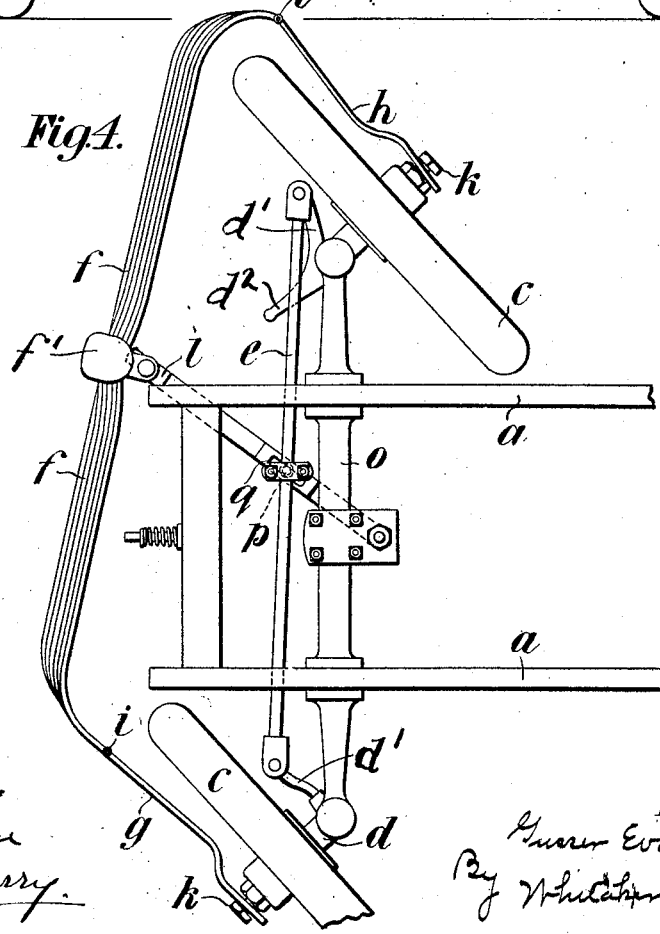

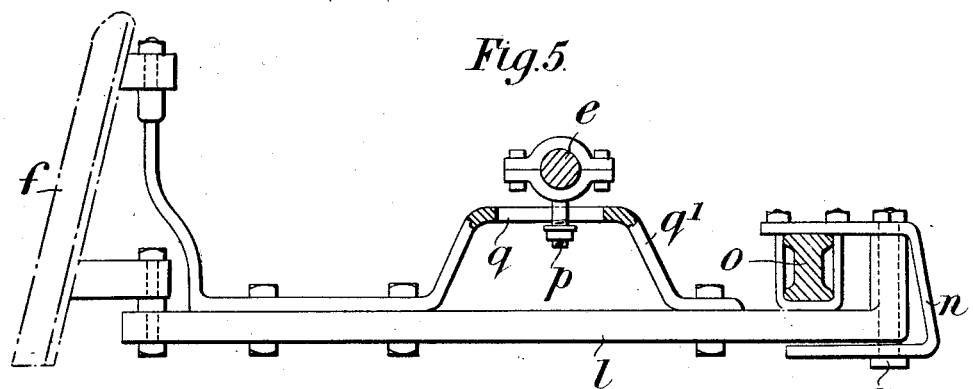
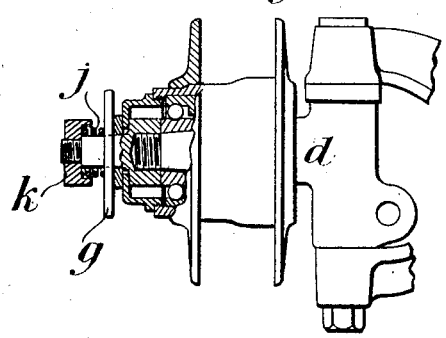
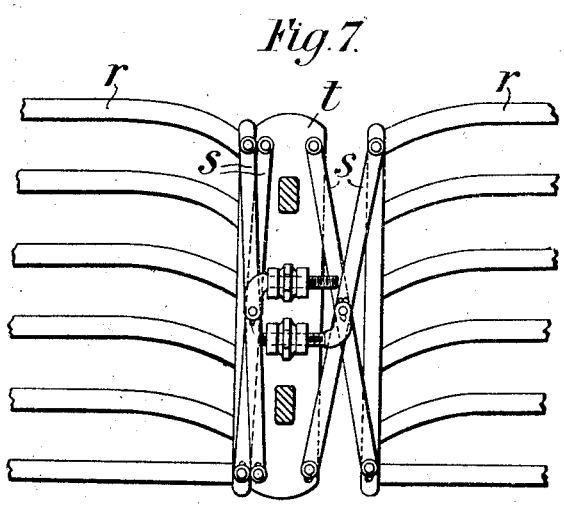

UNITED STATES PATENT OFFICE.

GUSSER EVANOVITCH, OF LONDON, ENGLAND.

WHEEL-GUARD OR OBSTRUCTION-REMOVER FOR MOTOR ROAD-VEHICLES.

1,113,421.  Specification of Letters Patent.  Patented Oct. 13, 1914.

Application filed May 5, 1913. Serial No. 765,614.

*To all whom it may concern:*

Be it known that I, GUSSER EVANOVITCH, a citizen of the United States of America, residing in London, England, have invented new and useful Improvements in Wheel-Guards or Obstruction-Removers for Motor Road-Vehicles, of which the following is a specification.

My invention relates to improvements in wheel-guards or obstruction removers for use upon motor road vehicles.

My improved wheel-guard or obstruction remover comprises a cradle which is suitably shaped to the body of the motor road vehicle and is adapted to be detachably secured either as a whole or in part to the lower part of the vehicle, so as to embrace the whole of the front of the same and also the front wheels, the said guard being, to permit of the wheels having full play, connected by suitable gear to the steering pillar of the vehicle in such a manner that it is positively actuated from the said steering pillar and is thereby caused to move simultaneously with the steering wheels of the vehicle. The cradle may be made in one piece or in a number of parts, say, three, namely, a central portion or two lateral or wing portions which are hinged or secured to the central portion.

The cradle may be made of any suitable material and either solid throughout or built up of a series of slats arranged either vertically or horizontally.

In some cases the side guards or hinged portions of the cradle may be dispensed with, the front portion of the said cradle being in such cases made sufficiently wide to protect the front of the steering wheels and being carried by a frame which moves with the vehicle wheels under the control of the steering wheel. In practice the said cradle may be made in two parts each of which is detachably hinged to the aforesaid frame for which purpose the latter may be provided with an upright bar or the like.

To enable a spare wheel to be applied to either of the front wheels in case of tire failure, both where a plain front guard and a front guard provided with the lateral hinged extensions is or are used, I may provide for temporarily extending the width of the main guard; this is advantageously effected by the employment of sections of expanding trellis in connection with the said main guard or by forming the latter wholly of such trellis work or in sections arranged to telescope one within the other.

It will be understood that the cradle can be detachable as a whole from the vehicle body or portions thereof, such as the lateral wings, only may be made detachable or be hinged to a member fixed permanently to the vehicle body. In any case the arrangement is such that while the cradle effectually covers the wheels the latter can be, with facility, uncovered or exposed when necessary.

To enable my invention to be fully understood, I will describe it by reference to the accompanying drawing, in which:—

Figure 1 is a side elevation of the front portion of a motor car shown provided with one form of my improved wheel-guard or obstruction-remover. Fig. 2 is a front elevation thereof. Fig. 3 is a plan view of the chassis showing the guard in the normal position. Fig. 4 is a view similar to Fig. 3, but showing the position of the device when the wheels are in full lock. Fig. 5 is a sectional side elevation illustrating details hereinafter described, and drawn to a larger scale. Fig. 6 is a sectional elevation of a detail showing the connection of one of the wing portions to the wheel axle, and Fig. 7 is a rear view of a portion of the cradle illustrating the expanding or trellis section.

$a$ represents the chassis of the motor car and $b$ the bonnet thereof, $c, c$ being the steering wheels which are mounted in the usual manner upon the stub axles $d$. The stub axles are pivotally mounted on the usual fixed axle $o$ and are provided with horizontal extensions $d'$, which are connected for joint movement by means of the rod $e$. One of the stub axles $d$ is provided with a further extension $d^2$, which is suitably connected to a rod $e'$ which is controlled from the steering pillar (not shown) in the ordinary manner.

Referring to the construction of my wheel-guard shown in Figs. 1 to 6, $f$ represents the central portion of the guard which is preferably formed of two parts connected by the central post $f'$ and $g$ and $h$ the two lateral or wing portions, these wing portions being at one end hinged to the central or front portion $f$ of the guard at the points $i$, and being secured at their other ends upon the outer ends of the stub axles $d$ as clearly shown. In practice, in order that the inequality of movements of the front portion $f$ and the wings $g$, $h$ when the steering wheels are turned as hereinafter described, may be compensated for, the ends of the wing portions $g$, $h$ are allowed a small amount of play upon the extremities of the stub axles, such longitudinal movement as is possible upon the axle ends being against the action of spiral springs $j$ coiled around the said axle ends between the outer faces of the wing portions $g$ and $h$, and the inner faces of the axle caps $k$ as shown in Fig. 6.

As will be seen the guard formed by the central or front portion $f$ and the lateral or wing portions $g$ and $h$ completely embraces the whole of the front of the vehicle, and also the front wheels $c$, $c$ which wheels, however, are allowed full play. This full play is rendered possible by the hinging of the side portions $g$, $h$ to the front portion $f$ of the guard and by the provision of means whereby the said front portion $f$ and consequently the wings $g$ and $h$ are caused to turn with the steering wheels $c$, $c$. To this end the front or central portion $f$ of the guard is detachably connected to a bar or frame $l$ which is pivotally mounted upon a bolt $m$ (Fig. 5) carried in the stirrup $n$, itself carried by the front fixed axle $o$. The bar $l$ is adapted to be rocked upon its pivot $m$ by the steering rod $e$, so that it accompanies the latter in its movement, this being effected by means of the downwardly extending stud $p$, which is secured to the said steering rod $e$ and engages a longitudinal slot $q$ provided in a bracket $q'$ upon the bar $l$.

In practice the guard is fitted to the vehicle in such a position that it inclines backward from the bottom upward as will easily be seen by reference to the drawings, the object of this backward tilting being to provide a tendency on the part of the device, to cause an obstruction which is struck to lean forward toward the car, thus diminishing the liability for such obstruction to pass beneath the car and thereby lessening the likelihood of serious injury arising to a person struck by the same.

As above described the cradle may be made of any suitable material and may be either solid throughout or, as represented in the drawing, built up of a series of slats arranged horizontally as shown, or vertically.

It will be clear from the foregoing description that when a vehicle fitted with my improved wheel-guard or obstruction-remover collides with an obstruction, such, for example, as a foot passenger, the guard protects the said passenger from the wheels of the vehicle and also tends to project him forward against the bonnet of the car thus tending to prevent his falling beneath the latter and thereby materially minimizing the danger likely to result from such a collision. Moreover, the guard covers the front of the vehicle and the wheels no matter to what angle the latter are turned, so that adequate protection is given even in the position of full lock of the wheels, shown in Fig. 4. Furthermore, notwithstanding the fact that the front of the steering wheels are adequately covered access can easily be had to the said wheels by detaching the hinged wings and swinging them back on the front portion $f$ of the cradle, so that a tire trouble can easily be attended to or any other attention given to the steering wheels that is required.

In some cases, as above described, the side guards $g$, $h$ may be dispensed with, in which event the obstruction remover is constituted solely by the front or central portion which is consequently made sufficiently wide to protect the fronts of the steering wheels, and is carried preferably by means of a frame which moves with the vehicle wheels under the control of the steering wheel in the manner above described. The cradle may be made in two parts each of which is detachably hinged to an upright bar, or the equivalent provided upon the aforesaid frame for the purpose.

Fig. 7 is a rear elevation of the central portion of the modified form of the cradle in which provision is made for increasing the width of the said cradle to permit an extra wheel to be placed along side of one of the front wheels in case of tire failure. For this purpose the front part of the cradle is made in two parts $r$, $r$ each connected by the lazy-tongs links $s$, $s$ to a vertical bar or pillar $t$ carried by the frame by means of which the device is secured to the chassis of the vehicle. It will be evident that each part $r$ of the cradle can be moved more or less away from the central pillar $t$ as is required and as is illustrated in the figure in which the part $r$ at the right hand is shown farther away from the pillar than that on the left hand.

Although I have described and illustrated my invention as applied to the front or steering wheels of a vehicle it will be obvious that it can be equally well applied to the back wheels when desired.

Claims—

1. A fender for vehicles comprising a cradle, and means for mounting the cradle upon a vehicle axle, said means comprising a stirrup rigidly mounted on said axle, a bar having one of its ends pivotally mounted in said stirrup and its other end carrying said cradle, and means provided on said bar for engaging the steering gear.

2. A fender for vehicles adapted to embrace the front and front wheels of said vehicle, comprising a cradle composed of a central portion and end portions, means for pivotally connecting said end portions to said central portion, to permit lateral adjustment, a bar connected to said central portion, means for pivotally connecting said bar to the vehicle axle, and means for connecting said bar to the steering gear of the vehicle.

3. A fender for vehicles comprising a cradle composed of a central portion and end portions, means for connecting said end portions to the steering axles, and elastic connections between said end portions and said steering axles.

4. A fender for vehicles comprising a cradle mounted upon the front axles of a vehicle and arranged to embrace the front and front wheels of said vehicle, said cradle consisting of a central portion and two lateral wing portions pivotally connected thereto, the central portion being extensible laterally and means connecting said cradle directly with the steering gear of the vehicle.

5. A fender for vehicles comprising a cradle mounted upon the front axles of a vehicle and arranged to embrace the front and front wheels of said vehicle, said cradle being composed of a central portion and end portions, the central portion consisting of a vertical post and two sides, rods pivotally connected to said post and to said sides for adjusting the central portion laterally, the end portions being pivotally connected to said central portion, and means connecting said cradle directly with the steering gear of the vehicle.

GUSSER EVANOVITCH.

Witnesses:
  JOHN E. BOUSFIELD,
  C. G. REDFEN.